United States Patent Office 3,560,289
Patented Feb. 2, 1971

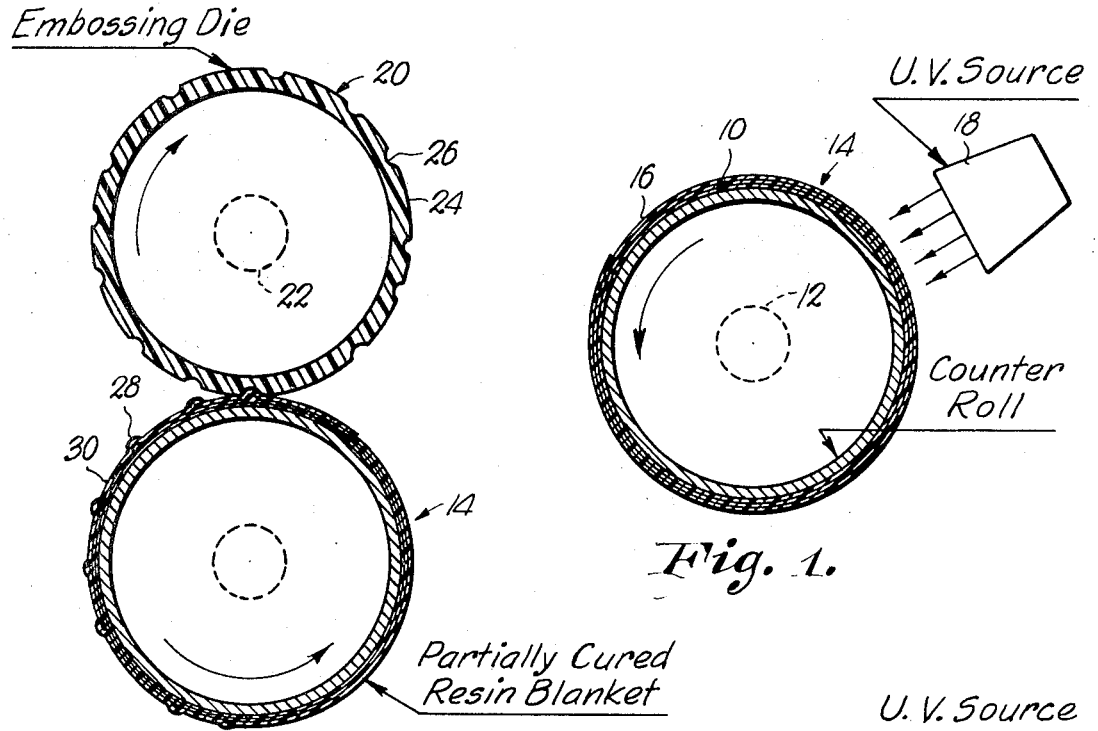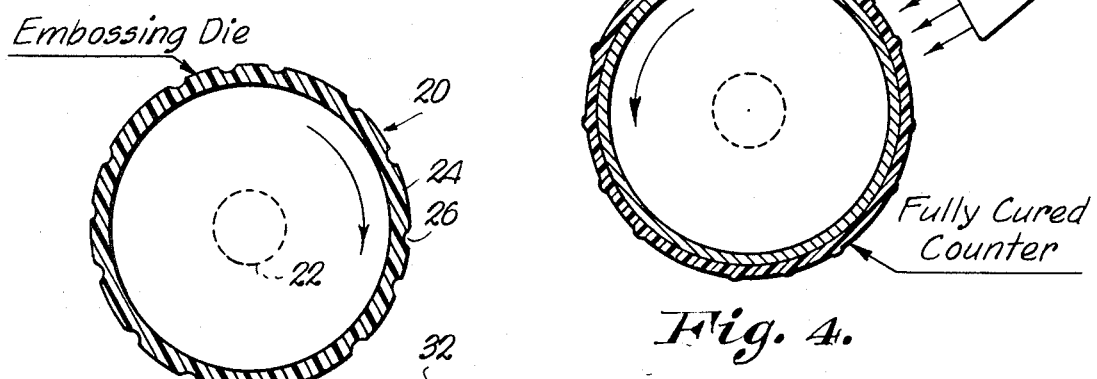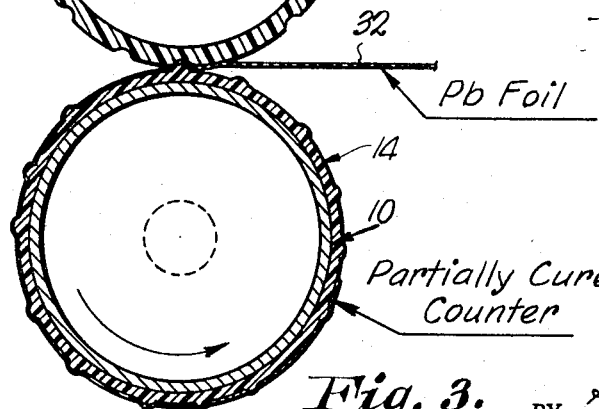

3,560,289
ROTARY EMBOSSING DIE COUNTER
Stanley W. Otto, Kansas City, Mo., and Seth W. Warrell, Shawnee Mission, Kans., assignors to Hallmark Cards, Incorporated, Kansas City, Mo., a corporation of Missouri
Filed Feb. 21, 1968, Ser. No. 707,199
Int. Cl. B31f *1/00*
U.S. Cl. 156—219                                          12 Claims

ABSTRACT OF THE DISCLOSURE

A rotary counter for use against a rotary embossing or foil stamping die having a modeled surface presenting a design. The counter is prepared by applying several layers of an ultraviolet sensitive, thermosetting synthetic resin reinforced with glass cloth to a counter roll. After partial curing of the resin to reduce the tackiness thereof, the die is rotated against the resin blanket on the counter roll to cause the outer face of the blanket to assume a shape which is the reverse of the die. A sheet of lead foil is inserted between the die and the deformed resin to provide paper clearance. Rotation of the die against the lead foil causes the latter to be deformed and the synthetic resin to assume the configuration of the adjacent face of the foil. Final cure of the resin on the counter roll is effected by application of ultraviolet energy to the resin during rotation of the counter roll.

---

This invention relates to the field of graphic arts and especially procedures, equipment and products which facilitate and provide sugnificant economies in the preparation of rotary counters adapted for use against rotary embossing or foil stamping dies having modeled surfaces presenting a design therein.

Specifically, the invention is concerned with methods of manufacturing rotary counters for modeled embossing or foil stamping dies which minimize down time of the press and obviate the necessity of the press operator running in a counter as has heretofore been necessary.

Various methods have been practiced for a long time in the graphic arts field to produce rotary embossing dies as well as foil stamping dies having modeled surfaces presenting artistic designs therein. These dies have been used for a number of different products including those in essentially sheet form, as well as web fed and re-rolled products such as gift wrapping paper and the like. Exemplary sheet form materials which have been embossed or foil stamped with a rotary press include greeting cards, calendars, party accessories, napkins, appliques for various paper and metal items, and decorative articles. The rotary system has been used for impressing a wide variety of materials including paper, metal and plastic.

Because of the modeled, intaglio relief in the surface of the die presenting the design therein, it is necessary to use a counter against the die having a modeled face which conforms to and is a reverse of the irregular surface of the die. Heretofore, it has been the practice to prepare a counter for use against rotary embossing and foil stamping dies, by running the die against a pressure deformable counter roll until the surface of the counter substantially assumed a relatively permanent set conforming to a reverse of the die. This required considerable time and precluded operation of the press during such period for profitable output. Generally, the counter was made up of a series of cotton or felt pads carried by a shaft and held in relatively tightly pressed relationship so as to present a generally cylindrical outer surface which could be brought into pressure engagement with the die. After running of the laminated counter against the die for a period of time, the outer surface of the laminate commenced to assume the shape of a reverse of the die, and in order to provide the desired paper clearance in the relieved face of the counter, it was conventional practice to insert sheets of the material to ultimately be embossed between the counter roll and the die so that the surface of the counter would be deformed to an extent which would provide compensation for the thickness of the paper or other sheet material. Needless to say, this practice was time consuming, required considerable skill on the part of the operator to know exactly when the counter was ready for use, and was costly because of the expense involved in providing a series of pressure deformable, mat-like members on the supporting shaft to present the counter blank.

It is therefore the primary object of the present invention to provide a rotary counter for use against a rotary embossing or foil stamping die which may be constructed without run-in on the press as has heretofore been necessary, and which inherently more accurately conforms to the modeled surface of the die to produce impressed designs of greater clarity, precision and uniformity.

A further important object of the invention is to provide a method of preparing a rotary counter for use against a rotary embossing or foil stamping die which permits simple and efficient relief of the surface of the counter to the extent deemed necessary for paper clearance and without the necessity of utilizing run-procedures practiced in the past.

A still further important object of the invention is to provide a method of constructing a rotary counter for use against embossing and foil stamping dies which utilizes partially cured, thermosetting synthetic resin material as the counter base and which is subject to curing by application of ultraviolet energy thereto, so that by wrapping the resin material around a counter roll and subjecting the same to ultraviolet energy, the initially tacky condition thereof is reduced without interfering with the pressure deformability of the material, thus permitting the die to be run against the material to the end that the surface of the resin is deformed to an extent to conform to the shape of the die as a reverse thereof and permitting a sheet of lead foil to be inserted between the die and the counter to provide paper clearance in the surface of the counter as it is run against the die whereby upon final curing of the resin by exposure to ultraviolet energy, a permanent counter is thus presented having a surface which very accurately conforms to the intaglio relief in the die.

The counters prepared in accordance with the present method are especially adapted for use against an embossing die usable to impress an overall embossed pattern in a sheet of web fed material, or a foil stamping die for both web fed and rolled material as well as sheet material if background relief is provided in the die. In this connection, it is to be understood that the die may be constructed in any suitable manner as for example, utilizing electrodeposition techniques, formation of thermosetting, initially planar blanks which are pierced and blanked at opposite ends thereof so that the mats may be attached to a suitable supporting cylinder therefor, or machined to present an intaglio modeled design in any type of suitable material including steel, brass, thermosetting synthetic resin, nickel or copper. For purposes of describing the present rotary counters and the procedures for constructing the same, it is assumed that the embossing or foil stamping cylinder is of the type described and prepared in accordance with the conventional methods outlined.

In the drawing:

FIG. 1 is a cross-sectional view through a counter cylinder or roll used on a rotary press, and schematically illustrating the way in which ultraviolet sensitive, thermosetting synthetic resin material is wrapped around the roll to form a blanket thereon, and then partially cured through application of ultraviolet energy thereto;

FIG. 2 is an essentially schematic cross-sectional view similar to FIG. 1 but illustrating the way in which an embossing die is run against the synthetic resin blanket on the counter roll to cause the surface of the synthetic resin to substantially conform to the modeled face of the die as a reverse thereof;

FIG. 3 is a schematic showing similar to FIG. 2 with the embossing die and counter roll being shown in cross-section, and illustrating the way in which lead foil is used to provide paper clearance relief in the synthetic resin blanket on the counter roll; and FIG. 4 is a schematic cross-sectional view of the counter roll alone and illustrating the way in which ultraviolet energy is directed onto the synthetic resin blanket to effect final cure thereof.

In FIG. 1, a counter roll or cylinder 10 adapted for rotation on a shaft 12 is illustrated in essentially schematic form and it is to be understood that this roll is in fact normally mounted in position on a rotary press of the type wherein the counter roll and an embossing cylinder adapted for use thereagainst are movable relatively to a limited extent without loss of registration beween the rolls. Exemplary structure which permits relative movement of the embossing die and counter roll without loss of registration between the cylinders is illustrated in U.S. Pat. No. 3,302,558 and especially FIG. 6 thereof.

With the counter roll 10 either removed from the press, or separated from the embossing cylinder to an extent to permit application of one or more layers of synthetic resin material thereto, a blanket broadly designated 14 is placed on the roll in circumscribing relationship thereto.

The preferred material for blanket 14 is a prepreg polyester synthetic resin laminating material reinforced with glass fiber cloth which is available in a partially cured state known as a "B" stage and which undergoes further cure by application of ultraviolet energy thereto. A preferred product comprising glass fiber cloth preimpregnated with an ultraviolet sensitive, thermosetting synthetic resin and available in its "B" stage of cure is Cordopreg UVFR distributed by the Cordo Division of Ferro Corporation, Norwalk, Conn. Best results have been obtained by utilizing material having a thickness of from .114 to .117 in sheet form and which is sufficiently tacky that it will adhere to itself and to the outer surface of counter roll 10. It has been found that the thickness of blanket 14 should be of the order of 0.040 to 0.050 and desirably, about 0.045, and thus three layers of the preimpregnated polyester described above should be wound around counter roll 10 to provide the blanket 14 thereon.

Next, the partially cured polyester synthetic resin should be subjected to a source of ultraviolet energy utilizing a Ferro-Allied curing unit spaced from the blanket 14 a distance of about 16 inches, and it has been found that three layers 16 of the synthetic resin material in initial sheet form and of a thickness approximately equal to 0.115 require about 5 minutes to completely cure. Accordingly, in accordance with the preferred procedure, the ultraviolet energy source 18 is activated for about one minute to partially cure the polyester resin. The purpose of such precure is to reduce the tackiness of the material without interfering with its ability to be pressure deformed and retain such shape after removal of the deforming surface therefrom.

Thus, referring to FIG. 2, after partial ultraviolet curing of blanket 14, the embossing die 20 rotatable about shaft 22 is brought into contact with blanket 14 so that the modeled surface 24 of die 20 having an intaglio relieved design 26 therein is in engagement with blanket 14 under sufficient pressure to cause the outer surface of the blanket to be deformed and thereby conform to the design 26 as a reverse thereof. Thus, the projections 28 in the outer face 30 of blanket 14 conform to and exactly mate with the relieved portions 26 of die 20. One revolution of counter roll 10 and die 20 is sufficient to produce projections 28, but the cylinders may be rotated additional revolutions if desired to assure complete deformation of the outer surface of blanket 14.

Next, the embossing die 20 is backed away from the roll 10 to an extent required to permit introduction of a sheet of lead foil 32 therebetween and the die then returned to its initial pressure engagement with roll 10 as indicated in FIG. 3. The lead foil is preferably of a thickness approximately two-thirds of the thickness of the sheet material to be embossed between die 20 and roll 10, and thus upon rotation of die 20 and the counter cylinder 10 relatively, the lead foil 32 is deformed and assumes the shape of the modeled outer surface 24 of die 20 while the outer surface of blanket 14 is further deformed and takes the shape of the adjacent face of lead foil 32. As a result, the blanket 14 is now relieved to an extent to provide paper clearance therein as compared with an exact reverse of the modeled surface 24 of die 20.

The final step of the process involves backing off the embossing die 20 and again subjecting the blanket 14 to ultraviolet energy from the source 18 to effect final curing of the resin. In this instance, the final cure should be effected in about four minutes. The resulting counter 34 as shown in FIG. 4 is adapted for direct use against embossing die 20 and because of the preparation of such counter on the press, exact registration is maintained between the raised face of the counter 34 and the relieved surface of die 20.

Although the procedure described above has made particular reference to the utilization of an embossing die and the preparation of a counter therefrom, it is to be understood that the method is equally applicable to a foil stamping die, if the die is provided with background relief in the surface thereof in surrounding relationship to the design.

Although the preferred material for providing paper clearance in the counter 34 is lead because this material has the desirable properties of being readily deformable under pressure but substantially incompressible so as to provide uniform paper clearance in the surface of the counter, other materials may be used in lieu of lead. For example, sheets of easily formed synthetic resin material such as urethane, polyethylene or polyethylene terephthalate sold under the trademark of Mylar, may be employed. In the case of the synthetic resin materials though, the thickness thereof should be approximately equal to the material to be embossed between die 20 and counter 34 since these resins are subject to some deformation under pressure and are not incompressible as is the case with lead.

Having thus described the invention, what is claimed as new and desired to be secured by Letters Patent is:

1. A method of constructing a rotary counter for use against a rotary die having a modeled surface presenting a design, said method comprising the steps of:

applying a layer of pressure deformable material to the cylindrical surface of a counter roll and characterized by the property of being hardenable to an extent to substantially permanently retain a deformed shape;

simultaneously rotating the die and said counter with the modeled surface of the die engaging the layer of material on the counter roll under sufficient pressure to cause the outer face of the layer of material to be deformed to an extent to substantially conform to the modeled surface of the die as a reverse thereof;

placing a pressure deformable sheet over the deformed modeled surface of the material, said sheet being of a thickness to approximately provide the paper clearance desired in the counter;

then simultaneously rotating the die and counter roll with the modeled surface of the die engaging the sheet overlying said deformed material under sufficient pressure to cause the sheet to assume substantially the configuration of said modeled surface of the die and the outer face of the material to assume the deformed shape of the adjacent face of the sheet; and subjecting the layer of deformed material on the counter roll to conditions to effect hardening thereof to produce said counter.

2. A method as set forth in claim 1 wherein said hardening of the material includes the step of first subjecting the layer of deformed material on the counter roll to conditions to effect only partial hardening thereof sufficient to cause the material to retain its deformed shape but subject to further deformation under pressure.

3. A method as set forth in claim 2 wherein is included the step of separating the die and said counter roll to permit placement of said sheet therebetween and again bringing the die and counter back into pressure relationship while maintaining the register between the designs thereon.

4. A method as set forth in claim 2 wherein is included the step of wrapping a number of layers of said material around the counter roll to provide a blanket thereover.

5. A method as set forth in claim 4 wherein is included the step of wrapping sufficient layers of said material around the counter roll to provide a coating thereover of at least about .040 inch.

6. A method of constructing a rotary counter for use against a rotary die having a modeled surface presenting a design, said method comprising the steps of:

applying a layer of synthetic resin material to the cylindrical surface of a counter roll, said material being in a first state of incomplete cure permitting pressure deformation thereof;

subjecting the layer of deformed material on the counter roll to conditions effecting further cure thereof to an extent that the material is capable of retaining a deformed shape but is subject to further deformation under pressure;

simultaneously rotating the die and said counter roll with the modeled surface of the die engaging the layer of material on the counter roll under sufficient pressure to cause the outer face of the layer of material to be deformed to an extent to substantially conform to the modeled surface of the die as a reverse thereof;

placing a pressure deformable sheet over the deformed modeled surface of the synthetic resin material, said sheet being of a thickness to approximately provide the paper clearance desired in the counter;

simultaneously rotating the die and counter roll with the modeled surface of the die engaging the sheet overlying said deformed material under sufficient pressure to cause the sheet to assume substantially the configuration of said modeled surface of the die and the outer face of the synthetic resin material to assume the deformed shape of the adjacent face of said sheet; and subjecting the layer of deformed material on the counter roll to conditions to effect final cure thereof to produce said counter.

7. A method as set forth in claim 6 wherein said application of a layer of synthetic resin material to the counter roll includes the step of placing a thermosetting synthetic resin on the counter roll of the type wherein the extent of cure thereof is dependent upon the amount of curing energy supplied thereto.

8. A method as set forth in claim 6 wherein said application of a layer of synthetic resin material to the counter roll includes the step of placing a thermosetting synthetic resin on the counter roll of the type which undergoes cure by application of ultraviolet energy thereto.

9. A method as set forth in claim 8 wherein is included the step of applying ultraviolet energy to said material while rotating the counter roll.

10. A method as set forth in claim 6 wherein placing of said sheet over the deformed material includes the step of inserting a sheet of incompressible foil between the die and said counter roll.

11. A method as set forth in claim 6 wherein placing of said sheet over the deformed material includes the step of inserting a sheet of urethane between the die and said deformed material on the counter roll.

12. A method as set forth in claim 6 wherein placing of said sheet over the deformed material includes the step of inserting a sheet of a polyethylene terephthalate resin between the die and said deformed material on the counter roll.

References Cited

UNITED STATES PATENTS

| 1,182,308 | 5/1916 | Paynter | 156—219 |
| 2,038,759 | 4/1936 | Roberts | 101—401.2 |
| 2,343,191 | 2/1944 | Kinlein | 101—401.1 |
| 2,602,397 | 7/1952 | Last | 101—401.5 |
| 2,645,178 | 7/1953 | Brainard et al. | 101—401.1 |
| 3,470,059 | 9/1969 | Jonnes | 101—401.1X |

SAMUEL W. ENGLE, Primary Examiner

U.S. Cl. X.R.

101—6, 401.1; 156—187